(12) United States Patent
Schall et al.

(10) Patent No.: US 9,090,765 B2
(45) Date of Patent: Jul. 28, 2015

(54) HIGHLY FUNCTIONALIZED RESIN BLENDS

(71) Applicant: Henkel IP & Holding GmbH, Duesseldorf (DE)

(72) Inventors: Joel D. Schall, Hamden, CT (US); Eric Hernandez Edo, Barcelona (ES); John G. Woods, Farmington, CT (US); David P. Dworak, Middletown, CT (US); Philip T. Klemarczyk, Canton, CT (US); Alfred A. DeCato, Waterbury, CT (US)

(73) Assignee: Henkel IP & Holding GmbH, Duesseldorf (DE)

( * ) Notice: Subject to any disclaimer, the term of this patent is extended or adjusted under 35 U.S.C. 154(b) by 0 days.

(21) Appl. No.: 14/345,863

(22) PCT Filed: Sep. 18, 2012

(86) PCT No.: PCT/US2012/055870
§ 371 (c)(1),
(2) Date: Mar. 19, 2014

(87) PCT Pub. No.: WO2013/043573
PCT Pub. Date: Mar. 28, 2013

(65) Prior Publication Data
US 2014/0221573 A1 Aug. 7, 2014

Related U.S. Application Data

(60) Provisional application No. 61/536,433, filed on Sep. 19, 2011.

(51) Int. Cl.
| | |
|---|---|
| *C08L 33/04* | (2006.01) |
| *C08L 33/08* | (2006.01) |
| *C08F 20/10* | (2006.01) |
| *C08J 3/00* | (2006.01) |
| *C08J 5/00* | (2006.01) |
| *C08F 8/10* | (2006.01) |
| *C08F 220/18* | (2006.01) |

(52) U.S. Cl.
CPC . *C08L 33/08* (2013.01); *C08F 8/10* (2013.01); *C08F 20/10* (2013.01); *C08F 220/18* (2013.01); *C08J 3/00* (2013.01); *C08J 5/00* (2013.01); *C08L 33/04* (2013.01); *C08F 2438/01* (2013.01)

(58) Field of Classification Search
CPC ............... C08J 3/00; C08J 5/00; C08F 8/10; C08F 20/10; C08F 220/18; C08F 2438/01; C08F 2220/1825; C08F 2220/1808; C08F 2220/281; C08L 33/04; C08L 33/08
USPC ........................................................ 525/222
See application file for complete search history.

(56) References Cited

U.S. PATENT DOCUMENTS

| | | |
|---|---|---|
| 6,974,853 B2 | 12/2005 | Husemann et al. |
| 2003/0105258 A1 | 6/2003 | Husemann et al. |
| 2004/0171779 A1 | 9/2004 | Matyjaszewski et al. |
| 2006/0074210 A1 | 4/2006 | Simal et al. |
| 2009/0118150 A1 | 5/2009 | Baum et al. |
| 2011/0213091 A1 | 9/2011 | Balk et al. |
| 2011/0224359 A1 | 9/2011 | Kautz et al. |

FOREIGN PATENT DOCUMENTS

WO 2009155303 A2 12/2009

OTHER PUBLICATIONS

Percec, V. et al. "Ultrafast Synthesis of Ultrahigh Molar Mass Polymers by Metal-Catalyzed Living Radical Polymerization of Acrylates, Metacrylates, and Vinyl Chloride Mediate by Set at 25°C" A. J. AM. Chem. Soc. 2006, 128, 14156-14165.

*Primary Examiner* — Nathan M Nutter
(74) *Attorney, Agent, or Firm* — Steven C. Bauman

(57) ABSTRACT

The present invention relates to multi-functional polymeric resin blends which have a defined average molecular weight distribution. Additionally each polymeric component of the blend has a polydispersity of from about 1.01 to about 2.50. The average functionality of the blend is from about 1.8 to about 4.0. More particularly, the present invention relates to poly(meth)acrylates having three or more functional groups. These highly functionalized resin blends are desirably prepared using controlled free radical polymerization techniques, such as single electron transfer living radical polymerization (SET-LRP) processes to produce a variety of blended resin systems which have tailored and enhanced properties.

20 Claims, 5 Drawing Sheets

Compression Set according to AFB

HIGHLY FUNCTIONALIZED RESIN BLENDS

FIELD OF THE INVENTION

The present invention relates to multi-functional polymeric resin blends which have a relatively narrow average molecular weight distribution. Each polymeric component of the blends has a polydispersity of less of about 1.01 to about 2.50. More particularly, the present invention relates to blends of poly(meth)acrylate polymers having three or more functionalized (meth)acrylates blended with mono- and/or di-(meth)acrylate-functionalized polymers. These highly functionalized resin blends are desirably prepared using controlled radical polymerization processes, such as single electron transfer living radical polymerization (SET-LRP) processes, to produce a variety of resin blends which have tailored and enhanced properties. In particular, the inventive resin blends exhibit unexpected tensile and elongation properties, while maintaining excellent compressive set properties as compared to prior resins.

BRIEF DESCRIPTION OF RELATED TECHNOLOGY

Typical difunctional resins, such as difunctional poly(meth)acrylate resins, have exhibited an increase in certain physical properties, such as tensile strength and elongation to break, as their average molecular weight increases. Robust tensile and elongation properties have generally been compromised, however, when attempting to also design a resin system which has a high cross-link density. Generally, higher cross-link density materials correspond to lower average molecular weight materials, and are generally ideal for designing resins which exhibit excellent compression set properties.

There is a need for resin compositions which provide for relatively average high molecular weights and yet exhibit high cross-linked density, thus allowing for desirable and enhanced properties in tensile and elongation while maintaining excellent compression set properties. Such resin compositions would be particularly useful in industrial applications where seals and gaskets are frequently needed.

SUMMARY OF THE INVENTION

The present invention meets the aforementioned needs without suffering from the limitations of prior known resins used for such purposes. In particular, the present invention provides resin blend compositions which include highly functionalized polymers, with a sufficiently high average molecular weight whereby excellent tensile strength and elongation properties are achieved, while also achieving sufficient cross-link density to provide excellent compressive set properties. The resin blends of the present invention also provide desirably lower compression set properties than conventional resins, as well as achieving high molecular weight with relatively low viscosities. Whereas resin compositions of the prior art typically lost tensile and elongation strength when attempting to achieve better compression set properties, and vice versa, the present invention provides a means to achieve higher tensile and elongation without loss of compression set properties, thus enhancing the ability to function in many applications, such as gasketing and sealing applications, among many others.

In particular, the inventive compositions are particularly useful for form-in-place (FIP), cure-in-place (CIP), and mold-in-place (MIP) gasket applications, as well as many other sealant and adhesive applications.

The highly functionalized resin blend compositions of the present invention are formed from polymers which have an average molecular weight of 5,000 g/mol or greater, desirably about 10,000 to about 100,000 g/mol and more desirably about 30,000 to about 50,000 g/mol. Desirably the polydispersity of the polymers which form the resin blend is from about 1.01 to about 2.50, more desirably less than 1.9, and even more desirably less than 1.8. Formulations made from the inventive resin blends desirably employ the resin blends in amounts of about 30% to about 90% by weight of the total formulation and desirably in amounts of about 30% to about 50% by weight of the total formulation.

The resin compositions of the invention may be prepared from various controlled freradical polymerization processes, including but not limited to SET-LRP methods, ATRP methods, RAFT methods as defined herein, to name a few. The inventive resin blend compositions may include relatively narrow polydispersed poly(meth)acrylates, having three or more reactive functionalities, desirably being endcapped with (meth)acrylate functionality. Functionalities other than (meth)acrylates may also be employed as endcapping groups, depending on the intended use and application for the resin.

In one aspect of the invention, there is provided composition which includes:
  a) a resin blend which includes:
    i) at least one vinyl polymer component containing at least three functional (meth) acrylate groups, which is desirably a polyacrylate-containing polymer component including at least three functional (meth)acrylate groups, said polymer component having a polydispersity of about 1.01 to about 2.50;
    ii) at least one reactive mono- or di-methacrylate-functionalized polymer component having a polydispersity of about 1.01 to about 2.50; and
  b) optionally at least one co-reactive component;
  wherein the average functionality of the resin blend is about 1.8 to about 4.0,
  and wherein the polymers of said resin blend have an average molecular weight of greater than about 5,000 g/mol. Desirably, the resin blend has as average molecular weight of about 10,000-100,000 g/mol.

Although the co-reactive component may be selected from a wide variety of materials, desirably the co-reactive component of b) is a mono- or multi-functional (meth)acrylate present in amounts of about 0% to about 50%. Desirably, the mono- or multi-functional (meth)acrylate component includes at least one alkyl(meth)acrylate monomer selected from the group of $C_1$-$C_{20}$ alkyl(meth)acrylates. This selection applies to all of the aspects of the invention desirable herein.

More desirably, the resin blend includes a polymer backbone which includes a homopolymer or copolymer of one or more monomers selected from the ethyl acrylate, methoxyethyl acrylate, n-butyl acrylate and combinations thereof. This selection applies to all of the aspects of the invention desirable herein.

Additionally, the resin blend as described herein in its various aspects may include polymers or polymer segments including one or more units selected from styrene, acrylonitrile, methacrylonitrile, acrylamide and substitutions of acrylamide and combinations thereof.

Desirably, the resin blend includes a curing component, such as a free radical initiator, moisture cure catalyst, heat cure catalyst or an anaerobic catalyst. In the case of photocuring compositions made from the inventive resin blends, the curing agent will include a photoinitiator. Examples of useful photoinitiators are provided herein.

Compositions of the present invention may include the resin blend in amounts of about 30% to about 90% by weight of the total composition.

In another aspect of the invention, there is provided a resin blend composition which is the reaction product of:
  i) at least one vinyl polymer component containing at least three functional (meth)acrylate groups, which desirably is a polyacrylate-containing polymer component including at least three functional (meth)acrylate groups, said polymer component having a polydispersity of about 1.01 to about 2.50;
  ii) at least one reactive mono- or di-methacrylate-functionalized polymer component having a polydispersity of about 1.01 to about 2.50; and
  b) optionally at least one co-reactive component;
wherein the average functionality of the resin blend is about 1.8 to about 4.0;
and wherein the polymers of said resin blend have an average molecular weight of greater than about 5,000 g/mol; and wherein the composition has one or more or the following properties:
  (i) a compression set of less than about 35% and desireably less than about 25%, more desirably lees than 20% and even more desireably less than about 10% to about 15%, after 70 hours of exposure to 25% compression at temperatures of 70° C.;
  (ii) an elongation at break (%) of about 150 to about 300 at about room temperature;
  (iii) a tensile strength (Mpa) of about 3 to about 8.

In yet another aspect of the invention, there is provided a process for applying a seal to an article which includes the steps of
  a) forming a composition including a resin blend comprising:
    i) at least one vinyl polymer component containing at least three functional (meth)acrylate groups, which is desirably a polyacrylate-containing polymer component including at least three functional (meth)acrylate groups, said polymer component having a polydispersity of about 1.01 to about 2.50;
    ii) at least one reactive mono- or di-methacrylate-functionalized polymer component having a polydispersity of about 1.01 to about 2.50; and
  b) optionally at least one co-reactive component;
wherein the average functionality of the resin blend is about 1.8 to about 4.0,
and wherein the polymers of said resin blend have an average molecular weight of greater than about 5,000 g/mol;
  c) depositing said composition on said article in the shape and thickness desired to form an uncured seal; and
  d) joining said uncured seal to another article and curing said uncured seal with a curing system appropriate to and for a sufficient time to form a seal.

In yet another aspect of the resent invention there is included a process for applying a seal to an article which includes the steps of:
  a) forming a composition including a resin blend comprising:
    i) at least one vinyl polymer component containing at least three functional (meth)acrylate groups, which is desirably a polyacrylate-containing polymer component including at least three functional (meth)acrylate groups, said polymer component having a polydispersity of about 1.01 to about 2.50;
    ii) at least one reactive mono- or di-methacrylate-functionalized polymer component having a polydispersity of about 1.01 to about 2.50; and
    iii) optionally at least one co-reactive component;
wherein the average functionality of the resin blend is about 1.8 to about 4.0,
and wherein the polymers of said resin blend have an average molecular weight of greater than about 5,000 g/mol;
  b) depositing said composition on said article in the shape and thickness desired to form an uncured seal; and
  c) curing said composition using one of the cure systems and cure mechanisms described herein to form a cured composition such as a gasket on said article and placing a second article in abutting relationship with said cured composition to form a seal between said article and said second article.

In yet another aspect of the invention there is provided a method of preparing a multi-functionalized resin blend which includes:
  a) providing a monomer composition in a solvent for said monomer;
  b) forming a reaction mixture by combining the monomer composition with a composition which includes;
    i) at least one multi-functional initiator having at least three of more functionalities;
    ii) at least one mono- or di-functional initiator; and
    iii) an organometallic compound or a hydride of Group IV-VIII transition metals;
  c) reacting the resulting mixture at a sufficient time and temperature to form a blend of multi-functional polymers, each of said polymers having a polydispersity of about 1.01 to about 2.50
  d) endcapping at least of portion of said polymers of said blend with reactive groups to form a blend having an average functionality of about 1.8 to about 4.0; and the polymers of said blend having an average molecular weight of from about 10,000 to about 100,000 g/mol.

In another aspect of the invention, each polymer in the blend may be first be formed descretely using controlled radical polymerization and then discretely functionalized and then blended together using the specific appropriate steps referred to above.

Moreover, in another aspect of the invention, the polymers of the blend may first be made discretely and then blended together, followed by adding the appropriate endcapping materials to functionalize the resin blend.

In another aspect of the invention there is provided a method of preparing a multi-functionalized resin blend comprising:
  a) providing a monomer composition (from any of the monomers described herein, and particularly (meth)acrylate monomers) in a suitable solvent for said monomer;
  b) forming a reaction mixture by combining the monomer composition with a composition comprising;
    i) at least one multi-functional initiator having at least three of more functionalities;
    iii) an organometallic compound or a hydride of Group IV-VIII transition metals;
  c) reacting the resulting mixture for a sufficient time and temperature to form a multi-functional polymer having at least three functional groups and desirably at least three (meth)acrylate functionalities (although any functionality mentioned in this application may be useful) said polymer having a polydispersity of about 1.01 to about 2.50;

d) providing a second monomer composition (from any of the monomers described herein, and particularly (meth) acrylate monomers) in a suitable solvent for said monomer;
e) forming a second reaction mixture by combining the second monomer composition with a composition comprising;
  ii) at least one mono- or di-functional initiator; and
  iii) an organometallic compound or a hydride of Group IV-VIII transition metals;
f) reacting the resulting mixture of step e) for a sufficient time and temperature to form a functional polymer having a mono- or di-functionality and desirably at least mono- or di-(meth)acrylate functionalities (although any functionality mentioned in this application may be useful) said polymer having a polydispersity of about 1.01 to about 2.50;
g) forming a blend of the results of the reactions of steps c) and f); and
h) endcapping at least of portion of said polymers of said blend with reactive groups to form a blend having an average functionality of about 1.8 to about 4.0; and the polymers of said blend having an average molecular weight of from about 10,000 to about 100,000 g/mol.

The above method can be used with any of the specific monomer and polymer components and other additives described herein to form the resin blend and curable compositions made therefrom.

In another aspect of the invention there is provided a method of preparing a multi-functionalized resin blend comprising:
a) providing a monomer composition (from any of the monomers described herein, and particularly (meth) acrylate monomers) in a suitable solvent for said monomer;
b) forming a reaction mixture by combining the monomer composition with a composition comprising;
  i) at least one multi-functional initiator having at least three of more functionalities;
  iii) an organometallic compound or a hydride of Group IV-VIII transition metals;
c) reacting the resulting mixture of step b) for a sufficient time and temperature to form a multi-functional polymer having at least three functional groups and desirably at least three (meth)acrylate functionalities (although any functionality mentioned in this application may be useful) said polymer having a polydispersity of about 1.01 to about 2.50;
d) endcapping at least of portion of said multi-functional polymer with reactive groups to achieve an average functionality of about 1.8 to about 4.0
e) providing a second monomer composition (from any of the monomers described herein, and particularly (meth) acrylate monomers) in a suitable solvent for said monomer;
f) forming a second reaction mixture by combining the second monomer composition with a composition comprising;
  ii) at least one mono- or di-functional initiator; and
  iii) an organometallic compound or a hydride of Group IV-VIII transition metals;
g) reacting the resulting mixture of step f) for a sufficient time and temperature to form a functional polymer having mono- or di-functionality and desirably at least mono- or di-(meth)acrylate functionalities (although any functionality mentioned in this application may be useful) said polymer having a polydispersity of about 1.01 to about 2.50;
h) endcapping at least of portion of said mono- or di-functional polymer with reactive groups to achieve an average functionality of about 1.8 to about 4.0
i) forming a blend of the results of the reactions of steps d) and h); wherein said blend has an average functionality of about 1.8 to about 4.0; and the polymers of said blend having an average molecular weight of from about 10,000 to about 100,000 g/mol.

The above method can be used with any of the specific monomer and polymer components and other additives described herein to form the resin blend and curable compositions made therefrom.

Formulations made from each of the resin blend compositions of the present invention desirably include a cure agent or system. The selection of the curing agent or cure system may largely be dictated by the intended use or application of the particular resin composition. While any cure agent or cure system which functions with and is compatible with the resin blend may be employed, of particular use are curing agents for irradiation cure (i.e. photocure), curing agents for heat cure and cure systems involving redox reactions, such as anaerobic cure systems.

Moisture cure agents may also be employed. The resin blend compositions described herein may thus include one of more cure agents or systems for providing cured products.

In some embodiments, curable compositions made from the reactive resin blends of the present invention have the following properties:
a.) a compression set of about less than about 35% and desirably less than about 25%, more desirably lees than 20% and even more desirably less than about 10% to about 15%, 70 hours of exposure to 25% compression at temperatures of 70° C.;
b.) an elongation at break (%) of about 150 to about 300 at room temperature (about 70° C.);
c.) a tensile strength (Mpa) of about 3 to about 8.

DETAILED DESCRIPTION OF THE INVENTION

Figure 1:
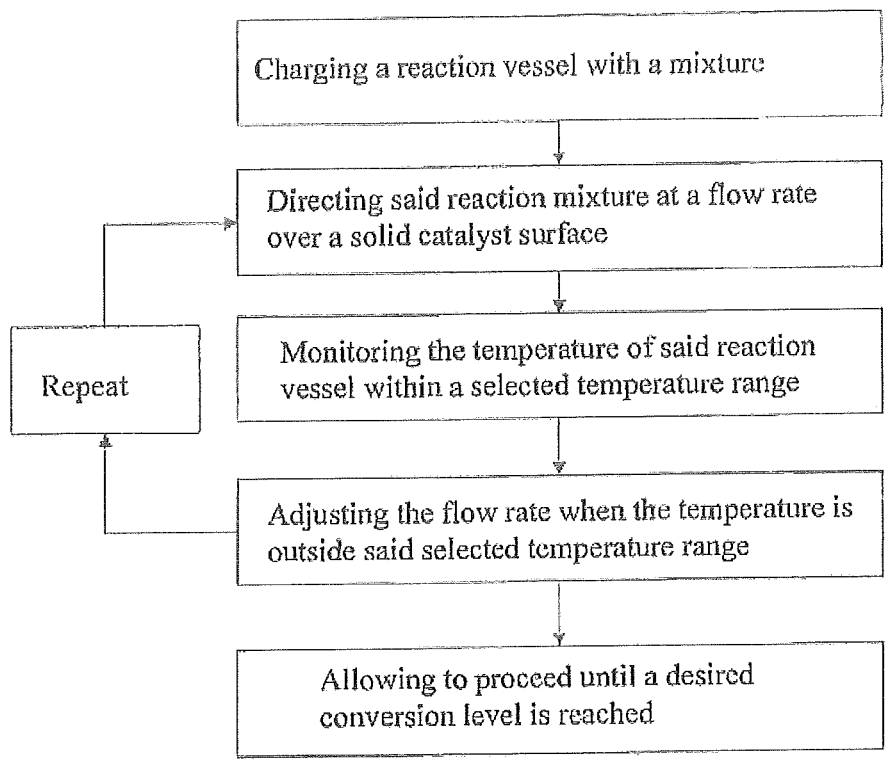
FIG. 1 shows a flowchart outlining an SET-LRP process (as defined herein), an example of a useful controlled free-radical polymerization process for making the resin blends.

For purpose of this present invention, the following definitions will apply:

The terms "cure" or "curing" as used herein, refers to a change in state, condition, and/or structure in a material that is usually, but not necessarily, induced by at least one variable, such as time, temperature, moisture, radiation, presence and quantity in such material of a curing catalyst or accelerator, or the like. The terms cover partial as well as complete curing. For purposes of the present invention, the terms mean at least partially crosslinked, and in more desirable embodiments substantially or fully crosslinked.

The terms "(meth)acrylate" or "(meth)acryloxy" will include methacrylate and acrylate and methacryloxy and acryloxy, respectively. This logic applies to other analogous uses of the term "(meth)" as a prefix.

The terms "halogen", "halo", or "hal" when used alone or part of another group mean chlorine, bromine or iodine.

The term "highly functionalized or highly functional polymer" means a polymer which has a functionality of three of greater, including multi-branched structures, including star-shaped polymers, comb polymers and those that have branches radiating from a central axis, as well as dendritic and hyper-branched structures.

The term "Average Functionality of the Blend" (AFB)= (functionality of polymer1)*(wt % of polymer1 in the blend)+(functionality of polymer2)*(wt % of polymer2)+ . . . +(functionality of polymerX)*(wt % of polymerX)

The term "polydispersity" (PD) (also known as "polydispersity index" and "molecular weight distribution") refers to the ratio of weight average molecular weight/number average molecular weight for a subject polymer. This value provides an indication of the broadness of the molecular weight distribution of the subject polymer. Thus, for a monodisperse polymer where the weight average molecular weight equals the number average molecular weight, the value will be 1. As the breadth of molecular weight distribution increases, the polydispersity will be greater than 1.

The reactive resin blends of the present invention are desirably formed using living (also known as "controlled") radical polymerization processes. These processes allow for control of the molecular weight distribution by controlling the propagation of the molecular chains, which includes maintaining the activity of the termini of the chains during the polymerization reaction. Among the useful controlled radical polymerization processes include without limitation single electron transfer—living radical polymerization (SET-LRP) and atom transfer radical polymerization (ATRP), as well as reversible addition fragmentation transfer (RAFT). SET-LRP is preferred. Other controlled radical processes are useful.

The reactive resin blends thus formed may have a variety of backbones and may be multi-functionalized with a variety of functional groups, the selection of which may be dictated by the desired properties and end uses.

In one particularly useful aspect of the invention, the backbone of the polymers in the blend is a polymer formed from various monomers including monofunctional (meth)acrylate monomers, such as homopolymers of monofunctional $C_{1-10}$ alkyl(meth)acrylates and copolymers of monofunctional $C_{1-10}$ alkyl(meth)acrylates. Among the particularly useful monomers used include ethyl acrylate, methoxyethyl acrylate, n-butyl acrylate and homopolymers and copolymers thereof.

As additional examples of useful monomers, there are included (meth)acrylic monomers such as (meth)acrylic acid, methyl(meth)acrylate, ethyl(meth)acrylate, n-propyl(meth)acrylate, isopropyl(meth)acrylate, n-butyl(meth)acrylate, isobutyl(meth)acrylate, tert-butyl(meth)acrylate, n-pentyl(meth)acrylate, n-hexyl(meth)acrylate, cyclohexyl(meth)acrylate, n-heptyl(meth)acrylate, n-octyl(meth)acrylate, 2-ethylhexyl(meth)acrylate, nonyl(meth)acrylate, decyl(meth)acrylate, dodecyl(meth)acrylate), phenyl(meth)acrylate, tolyl(meth)acrylate, benzyl(meth)acrylate, 2-methoxyethyl(meth)acrylate, 3-methoxybutyl(meth)acrylate, 2-hydroxyethyl(meth)acrylate, 2-hydroxypropyl(meth)acrylate, stearyl(meth)acrylate, glydicyl(meth)acrylate, 2-aminoethyl(meth)acrylate, γ-(methacryloxoxypropyl)trimethoxysilane, (meth)acrylic acid-ethylene oxide adduct, trifluoromethylmethyl(meth)acrylate, 2-trifluoromethylethyl(meth)acrylate, 2-perfluoroethylethyl(meth)acrylate, 2-perfluoroethyl-2-perfluorobutylethyl(meth)acrylate, 2-perfluoroethyl(meth)acrylate, perfluoromethyl(meth)acrylate, diperfluoromethylmethyl(meth)acrylate, 2-perfluoromethyl-2-perfluoroethylmethyl(meth)acrylate, 2-perfluorohexylethyl(meth)acrylate, 2-perfluorodecylethyl(meth)acrylate, 2-perfluorohexadecylethyl(meth)acrylate, etc.; styrenic monomers such as styrene, vinlytoluene, α-methylstyrene, chlorostyrene, styrenesulfonic acid and its salt; fluorine-containing vinyl monomers such as perfluoroethylene, perfluoropropylene, vinylidene fluoride, etc.; silicon-containing vinyl monomers such as vinyltrimethoxysilane, vinyltriethoxysilane, etc.; maleic anhydride, maleic acid, monoalkyl esters and dialkyl esters of maleic acid; fumaric acid and monoalkyl esters and dialkyl esters of fumaric acid; maleimide monomers such as maleimide, methylmaleimide, ethylmaleimide, propylmaleimide, butylmaleimide, hexylmaleimide, octylmaleimide, dodecyclmaleimide, stearylmaleimide phenylmaleimide, cyclohexylmaleimide, etc.; nitrile-containing vinyl monomers such as acrylonitrile, methacrylonitrile, etc.; amide-containing vinyl monomers such as acrylamide, methacrylamide, etc.; vinyl esters such as vinyl acetate, vinyl propionate, vinyl pivalate, vinyl benzoate, vinyl cinnamate, etc.; alkenes such as ethylene, propylene, etc.; conjugated diener such as butadiene, isoprene, etc.; vinyl chloride, vinylidene chloride, allyl chloride and allyl alcohol. These monomers may be used each alone or a plurality of them may be copolymerized. Among these, from the standpoint of physical properties of the product, styrenic monomers and (meth)acrylic monomers are preferred. Desirable are acrylic ester monomers and methacrylic ester monomers. In the present invention, those preferred monomers may be copolymerized with other monomers but, in such cases, said preferred monomers may account for 40 weight % of the total composition.

Additionally, the backbone of the inventive reactive resin blends may be formed from or include one or segments or units of acrylamide, substituted acrylamides, styrene, acrylonitrile or (meth)acrylonitrile, or a combination of these segments or units.

In one particularly useful aspect of the invention, the resin backbone is a terpolymer of ethyl acrylate, methoxyethyl acrylate and n-butyl acrylate. In an aspect of the invention, this terpolymer may include about 15-30% ethyl acrylate, 0-5% methoxyethyl acrylate and 70-85_% n-butyl acrylate. In one particularly useful aspect of the invention, the resin backbone is formed from a terpolymer including about 20% ethyl acrylate, about 5% methoxyethyl acrylate and about 75% n-butyl acrylate. The resin backbone may be a random or block copolymer.

Formation of the resin is desirably performed using a SET-LRP process or similar type of process as described herein, in order to achieve a narrow molecular weight distribution. Each polymeric component of the resin blend has a polydispersity from about 1.01 to about 2.50, as described herein, and more desirably 1.01 to about 1.5. Desirably, the average molecular weight of the polymers in the resin blend is about 5,000 g/mol up to about 100,000 g/mol. More desirably, the average molecular weight of the polymers of the resin blend is from about 10,000 to about 50,000 g/mol.

Preparation of the Resin Blends

The controlled radical polymerization process of the present invention includes the use of mono- and multi-functional initiators and a transition metal catalyst. Amines may also be employed as catalysts. The initiator is halogenated at its termini to allow for chain propagation at each of its arms, followed by functionalization at the termini.

Useful initiators for the invention include, without limitation, multi-functional (three or more functional groups) initiators for the formation of the polyacrylate polymers and mono and difunctional initiators for the mono and difunctional polymers of the blend. Examples of multifunctional (three of more) include, without limitation:

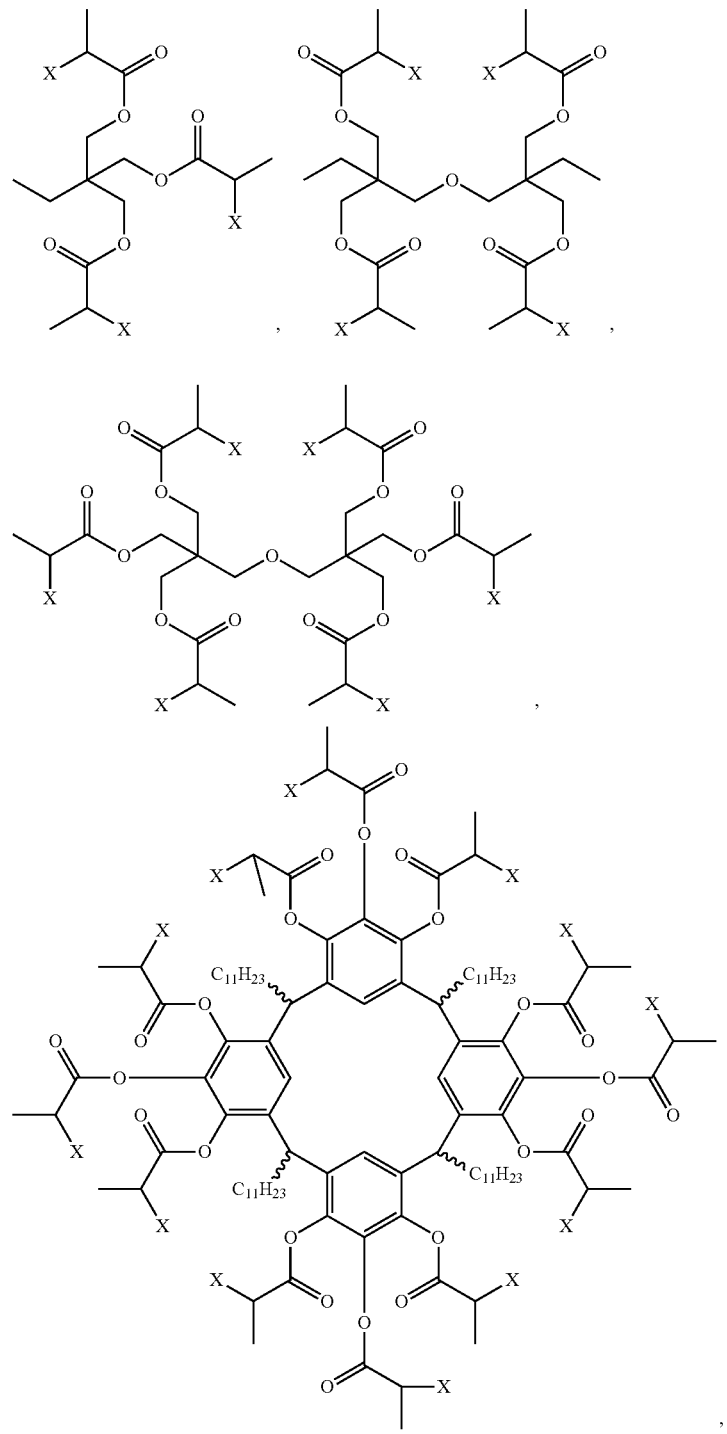

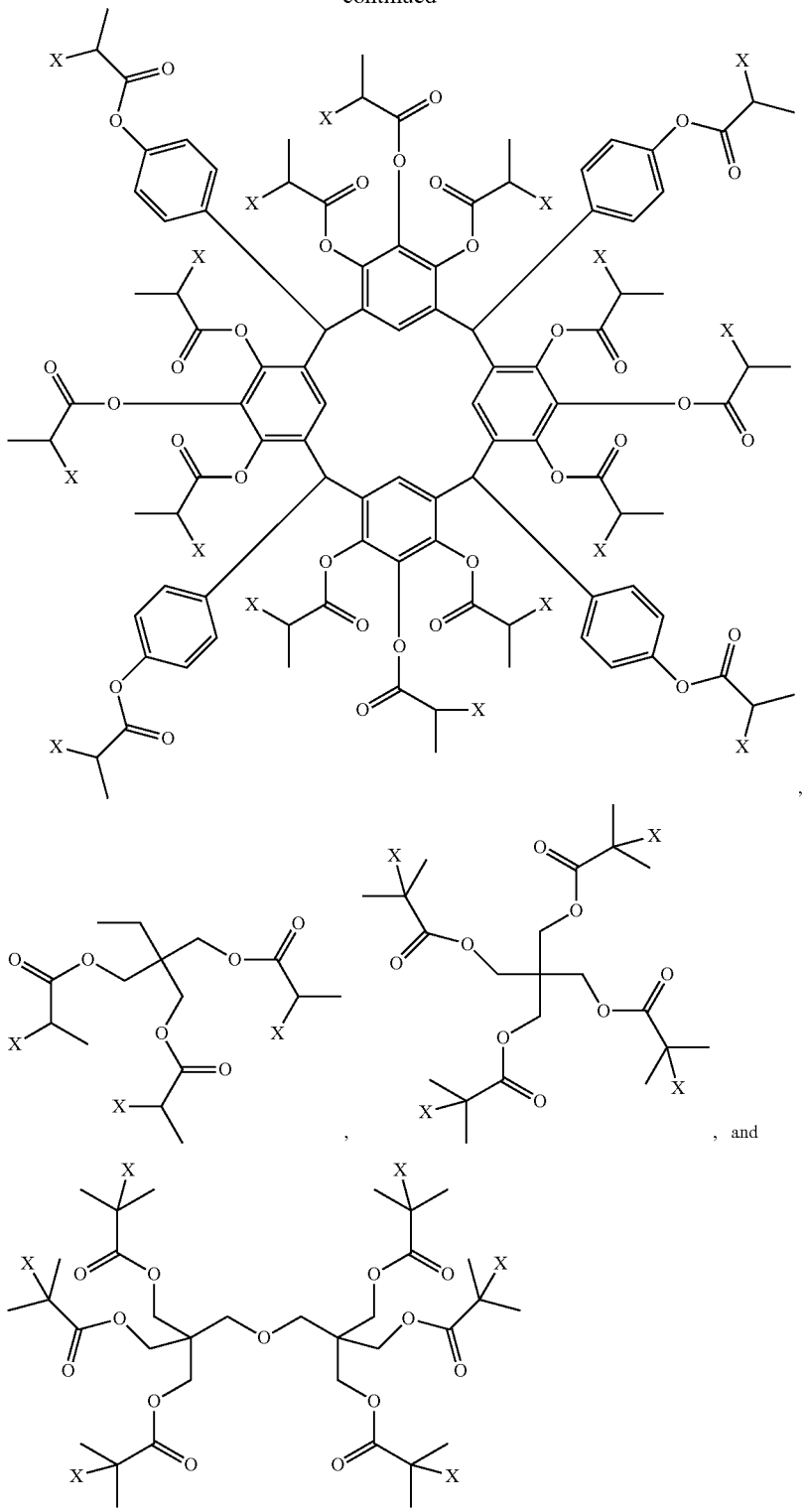

, and

Wherein X is halogen selected from Br, CL, FL or I. Bromine is particularly useful and is commercially available in the above initiator structures.

The amount of intitiator will depend on the desired molecular weight to be achieved.

The amounts of initiator relative to weight of composition used to form the reactive polymers of the resin blend should be from 0.1% to 99.9% by weight. The reason for the broad range is that the initial or intermediate polymers that are formed in SET-LRP or other controlled radical polymerization processes (CRP) may also be used as initiators. The weight ratio of monomer to initiator $$\left(\frac{Wt_{mon}}{Wt_{ini}}\right)$$

that is used in these polymerizations is dependent on the number average molecular weight ($\overline{M}_n$) of the polymer, the molecular weight of the initiator ($MW_{ini}$) and the fractional conversion (Conv) according to the relationship:

$$\left(\frac{Wt_{mon}}{Wt_{ini}}\right) = \left(\frac{\overline{Mn}}{MW_{ini}} - 1\right)\left(\frac{1}{Conv}\right)$$

In the present case, the upper limit for $\overline{M}_n$ is about 100,000. If the molecular weight of the initiator is close to the upper limit of the polymer, the ratio $$\frac{Wt_{mon}}{Wt_{ini}}$$

will be small, whereas if the molecular weight of the initiator is small, the ratio will be large.

For e.g. (extreme case) the addition of one unit of methyl acrylate (MW=86 g/mole) to a polymeric initiator of molecular weight 99,914 g/mole will provide polymer with molecular weight of 100,000 g/mole. In this case, conversion is complete (Conv=1) and the weight ratio will be $$\frac{Wt_{mon}}{Wt_{ini}} = \left(\frac{100,000}{99,914} - 1\right)$$
$$= 0.00086,$$

which corresponds to an initiator amount of 99.91% of polymer composition. On the other hand, if molecular weight of initiator is low, for example chloroform (MW=119) and the molecular weight of polymer is at the upper limit and conversion is complete, the weight ratio will be $$\frac{Wt_{mon}}{Wt_{ini}} = \left(\frac{100,000}{119} - 1\right)$$
$$= 839.34,$$

which corresponds to an initiator amount 0.12% of polymer composition.

Figure 2:
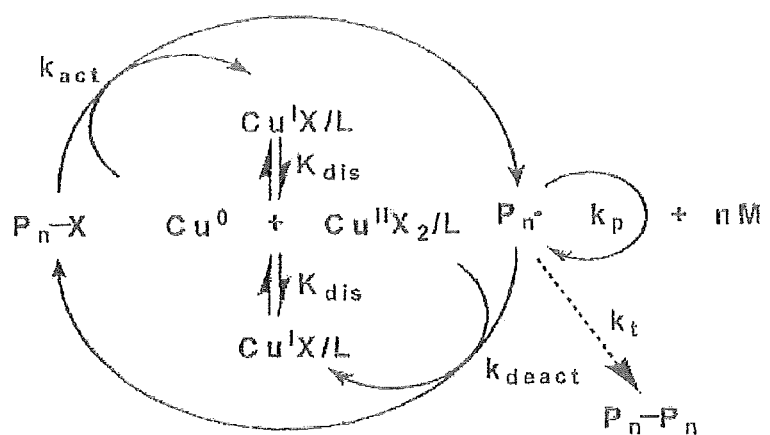
FIG. 2 depicts a proposed controlled radical polymerization according to SET-LRP mechanism which is useful in the present invention.

Metal-catalyzed organic radical reactions and controlled radical polymerization (CRP), are desirably performed in polar solvent systems, including mixtures of non-polar and polar systems. The mechanism may include reversible deactivation of the radicals by Cu(II) $X_2$ which is formed by disproportionation of Cu(I)X (See FIG. 2), via an outer-sphere SET process. This process has a very low activation energy and thus involves fast activation and deactivation steps and negligible bimolecular termination at room temperature. FIG. 1 illustrates a proposed SET-LRP process flow diagram. FIG. 2 illustrates a proposed SET mechanism. In FIG. 2, L is a ligand, X is a halide anion and P is polymer. For a more detailed discussion, see Percec, V. et al; "*Ultrafast Syntheses of Ultrahigh Molar Mass Polymers by Metal-Catalyzed Living Radical Polymerization of Acrylates, Methacrylates, and Vinyl Chloride Mediated by SET at 25°*"", A. J. AM. Chem. Soc. 2006, 128, 14156-14165, which is incorporated herein by reference in its entirety.

One particularly useful method of controlled radical polymerization is described in US Application No. PCT/US2009/047479, published as WO2009/155303A3, and assigned to Henkel Corporation, which is incorporated by reference herein in its entirety. This Application provides a method of directing the reaction mixture at a predetermined flow rate over a solid catalyst surface which is contained outside of the reaction vessel, and monitoring the temperature of the reaction vessel within a certain temperature range, adjusting the flow rate when the temperature range is outside the selected temperature range, and allowing the polymerization to proceed until a desired level of conversion is reached. Such a reaction process is shown in FIG. 1, as an example of one useful controlled free radical polymerization process.

SET-LRP may be performed at low activation energies and thus at lower temperatures. The catalyst used regenerates itself, thus the polymerization process is living. Increasing solvent concentration of the reaction mixtures gives faster polymerization. The SET-LRP reaction starts with a SET reaction between a Cu (O) species and a halogen-containing substrate (initiator or halogen-terminated polymeric chain end). The polymerization proceeds by an outer-sphere SET mechanism in which Cu (O) species acts as electron donors, and the dominant initiator and propagating species R—X (x is a halide anion) acts as electron acceptors.

There has been a continuing effort to make the controlled radical polymerization as environmentally benign and as low cost a process for the preparation of functional materials as possible. Factors such as control over the polymer molecular weight, molecular weight distribution, composition, architecture, and functionality are important considerations in the design and execution of such methods. The methods of the present invention allow for greater control over the final polymer products such that the desired chain length, polydispersity, molecular weight, and functionality are easily incorporated into the final product. Thus, the present invention overcomes the poor control over molecular weight distribution, low functionality, poor control of polymer rheology, and undesirable polydispersity. Also, because this process is so predicable, it can be easily implemented on a large scale with a high predictability and/or used to tailor the properties of the final polymer products to new degrees, and products can be designed based on their properties. Further, because there is less termination, the structure and composition of the polymer are more precise and the end product has more desirable properties and characteristics to promote a better product. Further, as very low levels of catalyst are needed to drive the reaction, purification of the final product is facilitated, and at times, unnecessary. Further, the components of the system may be optimized to provide even more precise control over the (co)polymerization of monomers.

The catalyst employed in the controlled or living polymerization processes used herein may contribute to determining the position of the atom transfer equilibrium and dynamics of exchange between dormant and active species. Thus, the catalyst employed should preferably be a good electron donor. The catalyst may be, for example: Cu(0); $Cu_2S$; $Cu_2Te$; $Cu_2Se$; Mn; Ni; Pt; Fe; Ru; V; CuCl; $CuCl_2$; CuBr; $CuBr_2$; and combinations thereof, and the like, as is known in the art. Similarly, other catalysts, including, for example, Au, Ag, Hg, Rh, Co, Ir, Os, Re, Mn, Cr, Mo, W, Nb, Ta, Zn, and compounds including one or more thereof may be employed with the present methods. One particularly effective catalyst is elemental copper metal, and its derivatives.

Copper complexes are especially desirable. Monovalent copper compounds includes such species as cuprous chloride, cuprous bromide, cuprous iodide, cuprous cyanide, cuprous oxide and cuprous perchlorate. When a copper cataylst is used, there is added such a ligand as 2,2'-bipyridyl or a derivative thereof, 1,10-phenanthrophosphorus or a derivative thereof, or a polyamine such as tetramethylethylenediamine, pentamethyldiethylene-triamine, hexamethyltris(2-aminoethyl)amine or the like for improved catalyst activity. The tris (triphenylphosphine) complex of ruthenium (II) chloride ($RuCl_2(PPh_3)_3$) is also a usual catalyst. When a ruthenium compound is used as the catalyst, an aluminum alkoxide is added as the activator. In addition, bis(triphenylphosphine) iron (II) chloride complex ($FeCl_2(PPh_3)_2$), bis(triphenylphosphine) nickel (II) complex ($NiCl_2(Pph_3)_2$) and bis (tributylphosphine) nickel (II) complex ($NiBr_2(PBU_3)_2$) are also suitable catalysts.

The catalyst may take one or more forms. For example, the catalyst may be in the form of a wire, mesh, screen, shavings, powder, tubing, pellet, crystals, or other solid form. The catalyst surface may be one or more of a metal, as previously disclosed or metal alloy. More particularly, the catalyst may be in the form of a copper wire, a copper mesh, a copper screen, a copper shaving, a copper powder, a copper gauze, a copper sinter, a copper filter, a copper sliver, a copper tubing, copper crystals, copper pellets, a coating of elemental copper on non-reactive materials, and combinations thereof.

Once the formation of the polymers in the blend or to be used in the blend is complete, the methods may include further reacting the resultant polymers to form multiple functional end groups thereon to increase crosslink density capability. The final products may then be implemented into various commercial products or procedures, as may be desired. In order to quench the reaction and terminate the process, strong nucleophiles may be added to the reaction mixture. Such nucleophiles include, for example: thiolate, amine, azide, carboxylate, alkoxide, and sodium carboxylate. One or a combination of nucleophiles may be used as may be desired in order to terminate the reaction while maintaining chain stability and integrity. Creating functional ends on the polymer may be done, for example, by performing either an end-capping reaction or a substitution reaction.

Suitable functional groups for terminally functionalizing the polymers in the blends of the present invention include, without limitation, methacrylate, hydroxy, siloxy, epoxy, cyano, isocyanate, amino, aryloxy, aryalkoxy, oxime, (meth) acryloxy, aceto, and reactive silanes such as alkoxy silanes, e.g., tetramethoxysilane, epoxyether and vinyl ether. In one embodiment, these groups may be added to one of more of the terminal ends of the inventive resin via reaction with compounds containing these functionalities.

Optional Co-Reactive Components

Suitable additional monomers for incorporating into the resin compositions of the present invention (once the resin blends are prepared) include, without limitation, acrylates, halogenated acrylates, methacrylates, halogen-substituted alkenes, acrylamides, methacrylamides, vinyl sulfones, vinyl ketones, vinyl sulfoxides, vinyl aldehydes, vinyl nitriles, styrenes, and any other activated and nonactivated monomers containing electron withdrawing substituents. These monomers may be substituted. Combinations of the monomers may be used. Blends of monomers may be polymerized using the embodiments of the present invention. The monomers may be blended in the reaction vessel. As an example, blends of (meth)acrylate monomers may be used with the methods of the present invention, as certain (meth)acrylates will exhibit similar reactivities, thus the end product may have a greater predictability. Blends of the final polymer product, as a two co-polymer blend, a two homopolymer blend, and a combination of at least one co-polymer and at least one homopolymer may be blended as may be desired. Further, blended polymers can be made as final products. Blended polymer products may be preferred to others because a blended copolymer may provide and promote good oil resistance in gasket applications. Specifically, the additional monomer may be one or more of, for example, alkyl(meth)acrylates; alkoxyalkyl(meth)acrylates; (meth)acrylonitrile; vinylidine chloride; styrenic monomers; alkyl and alkoxyalkyl fumarates and maleates and their half-esters, cinnamates; and acrylamides; N-alkyl and aryl maleimides; (meth)acrylic acids; fumaric acids, maleic acid; cinnamic acid; and combinations thereof. More specifically, the monomers used to create polymers with the embodiments of the present invention are not limited to any particular species but includes various monomers, for example: (meth)acrylic acid monomers such as (meth)acrylic acid, methyl(meth)acrylate, ethyl(meth)acrylate, n-propyl(meth)acrylate, isopropyl(meth)acrylate, n-butyl(meth)acrylate, isobutyl(meth)acrylate, tert-butyl(meth) acrylate, n-pentyl(meth)acrylate, n-hexyl(meth)acrylate, cyclohexyl(meth)acrylate, n-heptyl(meth)acrylate, n-octyl (meth)acrylate, 2-ethylhexyl(meth)acrylate, nonyl(meth) acrylate, decyl(meth)acrylate, dodecyl(meth)acrylate, phenyl(meth)acrylate, toluoyl(meth)acrylate, benzyl(meth) acrylate, 2-methoxyethyl(meth)acrylate, 3-methoxybutyl (meth)acrylate, 2-hydroxyethyl(meth)acrylate, 2-hydroxypropyl(meth)acrylate, stearyl(meth)acrylate, glycidyl(meth)acrylate, 2-aminoethyl(meth)acrylate, -(methacryloyloxypropyl)trimethoxysilane, (meth)acrylic acid-ethylene oxide adducts, trifluoromethylmethyl(meth)acrylate, 2-trifluoromethylethyl(meth)acrylate, 2-perfluoroethylethyl (meth)acrylate, 2-perfluoroethyl-2-perfluorobutylethyl (meth)acrylate, 2-perfluoroethyl(meth)acrylate, perfluoromethyl(meth)acrylate, diperfluoromethylmethyl(meth) acrylate, 2-perfluoromethyl-2-perfluoroethylethyl(meth) acrylate, 2-perfluorohexylethyl(meth)acrylate, 2-perfluorodecylethyl(meth)acrylate and 2-perfluorohexadecylethyl(meth)acrylate; styrenic monomers such as styrene, vinyltoluene, alpha-methylstyrene, chlorostyrene, styrenesulfonic acid and salts thereof; fluorine-containing vinyl monomers such as perfluoroethylene, perfluoropropylene and vinylidene fluoride; silicon-containing vinyl monomers such as vinyltrimethoxysilane and vinyltriethoxysilane; maleic anhydride, maleic acid, maleic acid monoalkyl esters and dialkyl esters; fumaric acid, fumaric acid monoalkyl esters and dialkyl esters; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide; nitrile-containing vinyl monomers such as acrylonitrile and methacrylonitrile; amido-containing vinyl monomers such as acrylamide and methacrylamide; vinyl esters such as vinyl acetate, vinyl propionate, vinyl pivalate, vinyl benzoate and vinyl cinnamate; alkenes such as ethylene and propylene; conjugated dienes such as butadiene and isoprene; vinyl compounds such as vinyl halides, such as vinyl chloride, vinylidenehalide, allylhalide, allyl alcohol, etc. The aforementioned monomers may be used singly, sequentially, or in combination. From the desirability of physical properties of products, one or more classes of monomer may be preferred.

Cure Systems

The inventive resin blends of the present invention may be formulated with a variety of cure systems, including but not limited to free-radical curing, moisture-curing, heat-curing and curing via redox reactions. Among free-radical curing systems are included room temperature and heat curing mechanisms, as well as photocuring mechanisms. Among the redox reactions useful for curing include anaerobic curing systems. Heat curing via hydrosilylation groups is also contemplated. The choice of cure system is largely dictated by the type of functional groups present and the specific application or end use of the composition.

Multiple cure systems may be employed, if desired. For example, photocuring and moisture curing compositions may be prepared from the inventive resin blends. Other examples of useful combinations is anaerobic curing and moisture curing, or photocuring and anaerobic curing.

Useful photoinitiators for formulating such compositions include, without limitation, those useful in the UV and visible light spectrums, for example, diphenylphosphinyl(2,4,6-trimethylphenyl)methanone (TPO), benzoin and substituted benzoins, such as benzoin ethylether, benzoin ethylether and benzoin isopropylether, benzophenone, Michler's ketone and dialkoxyacetophenones such as diethoxyacetophenone. Photoinitiators may be used in any amount effective to achieve the desired cure. Desirably, they are present in amounts of about 0.001% to about 10%, more desirably in amounts of about 0.1% to about 5% by weight of the total composition.

Useful visible light photo-initiators include, without limitation, camphorquinone peroxyester initiators, non-fluorene carboxylic acid peroxester initiators and alkyl thioxanthones, such as isopropyl thioxanthane, 7,7-dimethyl-2,3-dioxobicyclo[2.2.1]heptane-1-carboxylic acid, 7,7-dimethyl-2,3-dioxo [2.2.1]heptane-1-carboxy-2-bromoethylester, 7,7-dimethyl-2,3-dioxo[2.2.1]heptane-1-carboxymethylester and 7,7-dimethyl-2,3-dioxobicyclo[2.2.1]heptane-1-carboxylic acid chloride and combinations thereof. Diethoxyacetophenone (DEAP), diethoxyxanthone, chloro-thioxanthone, azo-bisisobutyronitile, N-methyldiethanolaminebenzophenol and combinations thereof may be used.

Heat curable compositions are among the various embodiments of the invention. Useful heat curing catalysts include, without limitation, hydrosilylation catalysts such as platinum, rhodium and their respective organohydrocarbon complexes. These heat curing catalysts may be present in amounts of about 0.01% to about 10% by weight of the total composition, and more desirably in amounts of about 0.1% to about 5% by weight of the total composition.

Moisture curing catalysts useful in compositions of the present invention include, without limitation, organometallic complexes, such as organotitinates (e.g. tetraisopropylorthotitanate, tetrabutoxyorthotitanate), metal carboxylates such as dibutyltin delaurate and dibutyltin dioctoate and combinations thereof. Moisture cure catalysts may be present in any amounts effective to achieve the intended cure. Desirable, they are incorporated in amounts of about 0.1% to about 5% by weight of the total composition.

Free radical initiators useful in formulating polymerizable compositions of the present invention include without limitation peroxy and perester compounds such as benzoyl peroxide, 2,4-dichlorobenzoyl peroxide, t-butyl perbenzoate, cumene hydroperoxide (CHP), di-t-butyl peroxide and dicumyl peroxide, 2,5-bis(t-butylperoxy) 2,5-dimethylhexane. Free radical initiators may be incorporated in any amounts useful to achieve the desired reaction or cure. Desirably, they are present in amounts of about 0.01% to about 10% by weight of the total composition. Combinations of the free-radical initiators are also useful.

Useful inhibitors to enhance shelf life and prevent premature reactions may be added to various embodiments where appropriate, as well as various chelators. For example, various quinones may be employed, such as hydroquinones, benzoquinones, napthoquinones, phenanthraquinones, anthraquinones and substitutions thereof may be employed, as well as various phenols, such as 2,6-di-tert-butyl-4-methylphenol. Chelating agents such as ethylene diamine tetracetic acid (EDTA) may be employed. The inclusion and specific selection and amounts used will depend on the embodiment chosen.

Heat curing catalysts include peroxides, as described herein and Azo compounds such as: 1,1'-Azobis(cyclohexanecarbonitrile) (ACHN); 2,2'-Azobis(2-methylpropionamidine) dihydrochloride (AAPH); 2,2'-Azobis(2-methylpropionitrile) (AIBN); 4,4'-Azobis(4-cyanovaleric acid) (ACVA). Heat curing catalysts may be used in amounts of about 0.1% to about 10% by weight of the total composition.

In formulations designed to cure anaerobically, appropriate anaerobic initiators, accelerator components and inhibitor or chelating components may be employed as described herein.

Catalysts and accelerators for anaerobically curable compositions made from the inventive compositions include any of the known catalysts and accelerators. For example sulfones such as bis(phenylsulfonemethyl)amine, N-methyl-bis-(phenylsulfonemethyl)amine, bis(p-tolylsulfonemethyl)amine, N-methyl-bis(p-tolylsulfonemethyl)amine, N-ethyl-bis(p-tolyl sulfonemethyl)amine, N-ethanol-bis(p-tolylsulfonemethyl)amine, N-phenyl-ptolylsulfonemethyl-amine, N-phenyl-N-methyl-p-tolylsulfonemethyl-amine, N-phenyl-N-ethyl-p-tolylsulfonemethyl-amine, N—P-tolyl-N-methyl-p-tolylsulfonemethyl-amine, bis-(p-tolylsulfonemethyl) ethylenediamine, tetrakis-(p-tolylsulfonemethyl) ethylenediamine, bis-(p-tolylsulfonemethyl)hydrazine, N-(p-cholorphenyl)-p-tolylsulfonemethyl-amine, and N-(p-carboethoxyphenyl)-(p-tolylsulfonemethyeamine may be employed. For most applications, the catalyst is used in amounts of from about 0.05 to 10.0% by weight, preferably from about 0.1 to 2% of the total composition.

The catalysts for anaerobic compositions of the present invention may be used alone in the anaerobic system or an accelerator such as orthosulfobenzimide (saccharin) may be employed in amounts of about 0.05 to 5.0% by weight of the monomer.

In anaerobic compositions, it may also be desirable to employ antioxidants, thermal stabilizers or free radical inhibitors such as teritary amines, hydroquinones, etc. in order to further prolong the shelf-like of the composition. In particular, it may be preferred to add a sterically hindered phenol, e.g. butylated hydroxytoluene (BHT), butylated hydroxyanisole (BHA), or such stabilizers as are commerically available under the tradenames Lonox 220 (Shell), Santonox R (Monsanto), Irganox 1010 and Irganox 1076 (Ciba-Geigy), etc.

Although the anaerobic compositions of the invention will cure satisfactorily under any set of anaerobic conditions, the presence of selected metals on the surface of the components to be bonded will appreciably increase the rate of curing. Suitable metals which are effective with these anaerobic compositions include iron, copper, tin, aluminum, silver and alloys thereof. The surfaces provided by the metals, alloys and their platings and which are useful in accelerating curing of these compositions will, for convenience, be grouped into the term "active metal" surfaces and be understood to include but not be limited to all of the metallic entities mentioned above. It is to be further noted that in bonding components which do not comprise these active metals (e.g. plastic, glass, non-active metal surfaces) it may be desirable to accelerate curing by pretreating these surfaces with an active metal compound which is soluble in the monomer-catalyst mixture such as ferric chloride, and cobalt, manganese, lead, copper and iron "soaps" such as cobalt-2-ethyl hexoate, cobalt butyrate, cobalt naphthenate, cobalt laurate, manganese-2-ethyl hexoate, manganese butyrate, manganese naphthenate, manganese laurate, lead-2-ethyl hexoate, lead butyrate, lead naphthenate, lead laurate, etc. and mixtures thereof. These active metal compounds may be readily applied to the surfaces, for example, by wetting the surfaces with a dilute solution of the metal compound in a volatile solvent such as trichloroethylene and then permitting the solvent to evaporate. Non-active surfaces treated in this manner can be bonded together with the sealants of the present invention as quickly as active metal surfaces.

The resin blend compositions of the present invention may include one or more components selected from the group consisting of reactive diluents, non-reactive diluents, fillers, plasticizers, stabilizers, antioxidants, curing agents, cross-linking agents, catalysts, pigments, elastomers, and combinations thereof.

EXAMPLES

Example 1

Preparation of a three-armed polymer by Single Electron Transfer Living Radical Polymerization (SET-LRP)

This example demonstrates the use of SET-LRP to produce a multi-armed (star) polymer having three arms. The number of arms may be controlled by the initiator used. In the present case, a three-armed polymer was prepared. The specific initiator used had the following structure:

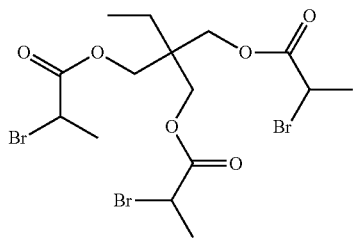

Trifunctional Initiator

In this example, a trifunctional, three-armed acrylate terpolymer was prepared by preparing a reaction mixture of 240.7 g ethyl acrylate, 80.17 g methoxyethyl acrylate, 1184.29 n-butyl acrylate, 394.3 g dimethyl sulfoxide, 283.5 g acetone, 0.45 g copper (II) bromide, 21.56 g of trifunctional initiator (shown above) and 0.922 g hexamethyldiethylene triamine. The reaction mixture was purged with argon, and then 1.5 g of activated copper (0) mesh was submerged into solution. The reaction was run with an argon sparge. The reaction mixture was quenched at 85% conversion by introducing oxygen, and the reaction mixture was treated by adding 2000 ppm etidronic acid and stirring for one (1) hour. The resultant bromine-capped terpolymer was passed through a bed of celite and alumina (40 g and 250 g, respectively). GPC of the filtered solution indicated a Mn of about 30,800 and a polydispersity (PDI) of about 1.06.

Capping of the Multi-Functional Polymer

The ends of the three-armed polymer prepared above were then each capped with (meth)acrylate functionality. 1092.07 g of the three-armed terpolymer prepared above was added to 968 solvent (DMSO/Acetone, ~1.4/1) in a 250 ml three-neck flask equipped with a thermocouple, stirrer and mixing blade. The flask was heated to 70° C. and subjected to vacuum (<1 torr). As much of the solvent as possible was removed during approximately four hours. A powder funnel was used to add 23.225 g potassium carbonate and 0.218 g Irganox 1010 (antioxidant). The reaction mixture was allowed to mix for ten minutes and then 24.218 g acrylic acid was added. This reaction mixture was stirred at 70° C. for six (6) hours. At the end of this time, the solution was diluted 2:1 with toluene and washed two times with brine. The organic phase was isolated, dried over magnesium sulfate, and then filtered through a 1 micron filter. The straw-colored product was devolatilized under vacuum (<500m Torr) to obtain a viscous, yellow acrylate-functionalized polyacrylate (Polymer 2). End group analysis by $^1$H NMR indicated a functionality of approximately 2.9.

Example 2

Comparative

This example uses an unblended, conventional approximately difunctional polyacrylate polymer (actual functionality 1.7, referred to as Polymer 1 herein) as opposed to the >3 functionalized poly(meth)acrylate polymers described in Example 1.

A comparative polymer composition was made as follows (% weight of the total composition):

1 g (1%) of Irganox 3052 (antioxidant) is dissolved in 20 g (20%) of N,N-dimethylacrylamide and then added to 73 g (73%) difunctional, 3000 g/mol polyacrylate polymer ("Polymer 1"), 1 g (1%) Darocure 1173 (photoinitiator), and 5 g (5%) Aerosil 380 (silica filler). The composition is mixed in a speed mixer, and 5×5×0.075 inch test sheets are prepared and cured by irradiating with UV light for 30 sec. per side (60 sec. total) at an irradiance of approximately 120 mW/cm². The cured films are used for the production of "dogbone" tensile specimens, 1.25" diameter discs used for compression set measurement, and ~2×0.25" rectangular strips used for dynamic mechanical analysis.

Example 3

Inventive

This example provides a polymer composition according to the present invention comprising a blend of trifunctional polymer (Polymer 2) with an additional difunctional polymer (Polymer 1).

34.93 wt. % difunctional 30,000 g/mol polyacrylate polymer ("Polymer 1") is blended with 38.07 wt. % trifunctional, 30,000 g/mol polyacrylate polymer ("Polymer 2"). To the blend is added a solution of 1 wt. % Irganox 3052 in 20 wt. % N,N-dimethylacrylamide (co-reactive component), 5 wt. % Aerosil R380, and 1 wt. % Darocure 1173. The composition is mixed in a speed mixer, and test specimens are prepared as described in Example 2.

Example 4

Compression set measurements are made by compressing a 6-ply stack of discs by 25% and heating in a convection oven for 70 hours at 70° C. The compression set is expressed as the percentage of the initial 25% compression that remains after the compressive force has been removed and the sample has been allowed to cool to room temperature (low values are desirable). Tensile strength and elongation at break were measure on an Instron according to conventional methods; $T_g$ was measured by dynamic mechanical analysis and defined as the temperature at which tan δ peaks. The table below contains the results from the compositions described in Examples 2 and 3 above:

|  | Control Difunctional Polymer Alone Example 2 | Blend of Difunctional Polymer 1 & Inventive Polymer 2 Example 3 (Inventive Resin Blend) |
|---|---|---|
| Compression Set (%) | 38 | 25 |
| Tensile Strength at Break (psi) | 430 | 930 |
| Elongation at Break (%) | 190 | 220 |
| Tg (° C.) | −25 | −23 |

The data indicate that a blend of trifunctional and difunctional polymers provided much better compression set, elongation, and tensile strength than the conventional difunctional polymer alone.

Example 5

This example is another inventive example showing the effect of different ratios of the inventive resin blends on the mechanical properties. A number of compositions with different ratios of polymer 1 and polymer 2 were prepared following the general formulation in Example 3; filler, monomer, photoinitiator, and antioxidant concentrations were kept fixed while only the relative proportions of polymers 1 and 2 were varied. The parameter "Average Functionality of the Blend" (AFB) was defined as:

AFB=(Functionality of polymer 1)*(wt % polymer 1 in blend)+(functionality of polymer 2)*(wt % polymer 2)+ . . . +(functionality of polymer *n*)* (wt % of polymer *n*)

The table below shows test results for the range of compositions prepared; note that AFB=2.3 corresponds to Example 3, and AFB=2.9 represents a composition that contains no polymer 1 (i.e., it contains 73 wt % polymer 2, not blended with any lower functionality polymer).

| | (WT %) | | | |
|---|---|---|---|---|
| Composition | A Inventive | B Inventive | C Inventive | D Comparative |
| Polymer 1 | 53.94 | 34.93 | 15.87 | — |
| Polymer 2 | 19.06 | 38.07 | 57.13 | 73.0 |
| Irganox 3052* | 1.0 | 1.0 | 1.0 | 1.0 |
| N,N-dimethyacrylamide | 20.0 | 20.0 | 20.0 | 20.0 |
| Aerosil** | 5.0 | 5.0 | 5.0 | 5.0 |
| Darocure 1173*** | 1.0 | 1.0 | 1.0 | 1.0 |
| AFB | 2.1 | 2.3 | 2.6 | 2.9 |
| Compression Set (%) | 28 | 25 | 23 | 22 |
| Tensile Strength at Break (psi) | 900 | 930 | 750 | 610 |
| Elongation at Break (%) | 240 | 220 | 175 | 190 |
| Tg (° C.) | −24 | −23 | −23 | −23 |

*antioxidant
**silica filler
***photoinitiator

It can be seen from this data that compositions based on blends of polymers 1 and 2 have a more desirable combination of physical properties for gasketing application than the composition D, which is based on trifunctional polymer alone. Specifically, compositions A and B have acceptable compression set and signifantly higher tensile strength and elongation than composition D.

Example 6

A 30,000 molecular weight, monofunctional polyacrylate polymer (Polymer 3) was prepared via SET-LRP as described in Example 1 by using a monofunctional initiator. Blends of Polymer 1+Polymer 3, Polymer 2+Polymer 3, and Polymer 1+Polymer 2 were prepared in varying ratios to provide a map of gasket properties versus AFB. The resulting test data are shown in the table below and plotted in the graphs that follow.

| Composition | E | F | G | H | I | J | K |
|---|---|---|---|---|---|---|---|
| Polymer 1 (difunctional) | 12.17 | 18.25 | 36.5 | 54.75 | 73 | 53.94 | 34.92 |
| Polymer 2 (trifunctional) | 0 | 0 | 0 | 0 | 0 | 19.06 | 38.08 |
| Polymer 3 (monofunctional) | 60.83 | 54.75 | 36.5 | 18.25 | 0 | 0 | 0 |
| Irganox 3052 | 1.0 | 1.0 | 1.0 | 1.0 | 1.0 | 1.0 | 1.0 |
| N,N-dimethylacrylamide | 20.0 | 20.0 | 20.0 | 20.0 | 20.0 | 20.0 | 20.0 |
| Aerosil | 5.0 | 5.0 | 5.0 | 5.0 | 5.0 | 5.0 | 5.0 |
| Darocure 1173 | 1.0 | 1.0 | 1.0 | 1.0 | 1.0 | 1.0 | 1.0 |
| AFB | 0.95 | 1.03 | 1.25 | 1.48 | 1.70 | 2.01 | 2.33 |
| Compression Set (%) | 65 | 50 | 42 | 44 | 38 | 28 | 25 |
| Tensile Strength (psi) | 360 | 410 | 550 | 510 | 435 | 899 | 928 |
| Elongation at Break (%) | 290 | 250 | 240 | 250 | 190 | 240 | 220 |
| Tg (° C.) | −27 | −27 | −26 | −25 | −25 | −24 | −23 |

| Composition | L | M | N | O | P | Q | R |
|---|---|---|---|---|---|---|---|
| Polymer 1 (difunctional) | 15.87 | 0 | 0 | 0 | 0 | 0 | 0 |
| Polymer 2 (trifunctional) | 57.13 | 73 | 10.43 | 20.86 | 27.81 | 31.23 | 38.42 |
| Polymer 3 (monofunctional) | 0 | 0 | 62.57 | 52.14 | 45.19 | 41.77 | 34.58 |
| Irganox 3052 | 1.0 | 1.0 | 1.0 | 1.0 | 1.0 | 1.0 | 1.0 |
| N,N-dimethylacrylamide | 20.0 | 20.0 | 20.0 | 20.0 | 20.0 | 20.0 | 20.0 |
| Aerosil | 5.0 | 5.0 | 5.0 | 5.0 | 5.0 | 5.0 | 5.0 |
| Darocure 1173 | 1.0 | 1.0 | 1.0 | 1.0 | 1.0 | 1.0 | 1.0 |
| AFB | 2.64 | 2.90 | 1.10 | 1.40 | 1.60 | 1.70 | 1.91 |
| Compression Set (%) | 23 | 22 | 63 | 54 | 43 | 42 | 37 |
| Tensile Strength (psi) | 754 | 610 | 247 | 508 | 624 | 696 | 682 |
| Elongation at Break (%) | 175 | 190 | 150 | 180 | 175 | 190 | 180 |
| Tg (° C.) | −23 | −23 | −29 | −26 | −26 | −25 | −24 |

Figure 3:
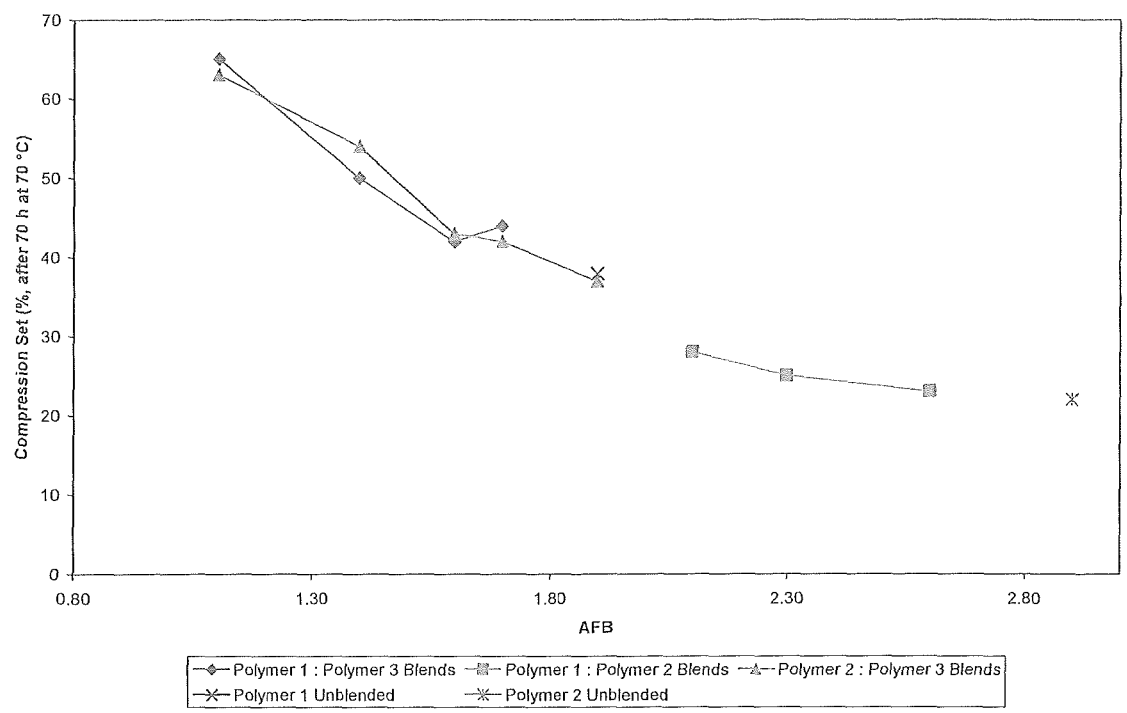
FIG. 3 is a graph of compression set results as a function of AFB (as defined herein) of polymer resin blends according to the invention compared to conventional unblended results of the same polymers.
Figure 4:
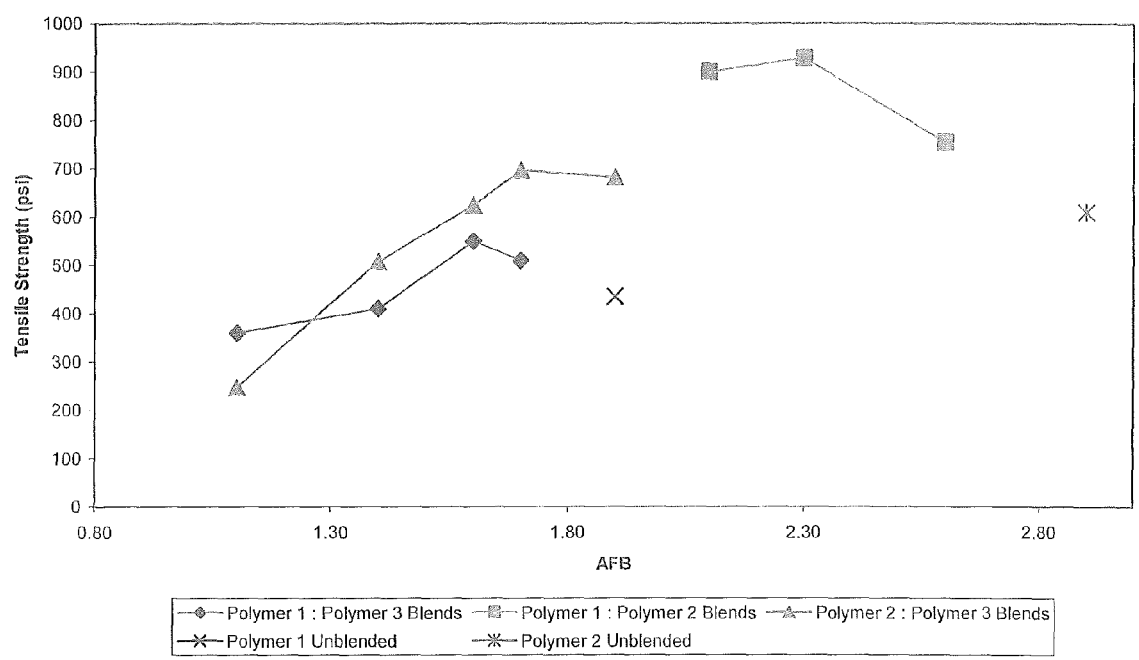
FIG. 4 is a graph of tensile strength results as a function of AFB of polymer resin blends according to the invention compared to conventional unblended results of the same polymers.
Figure 5:
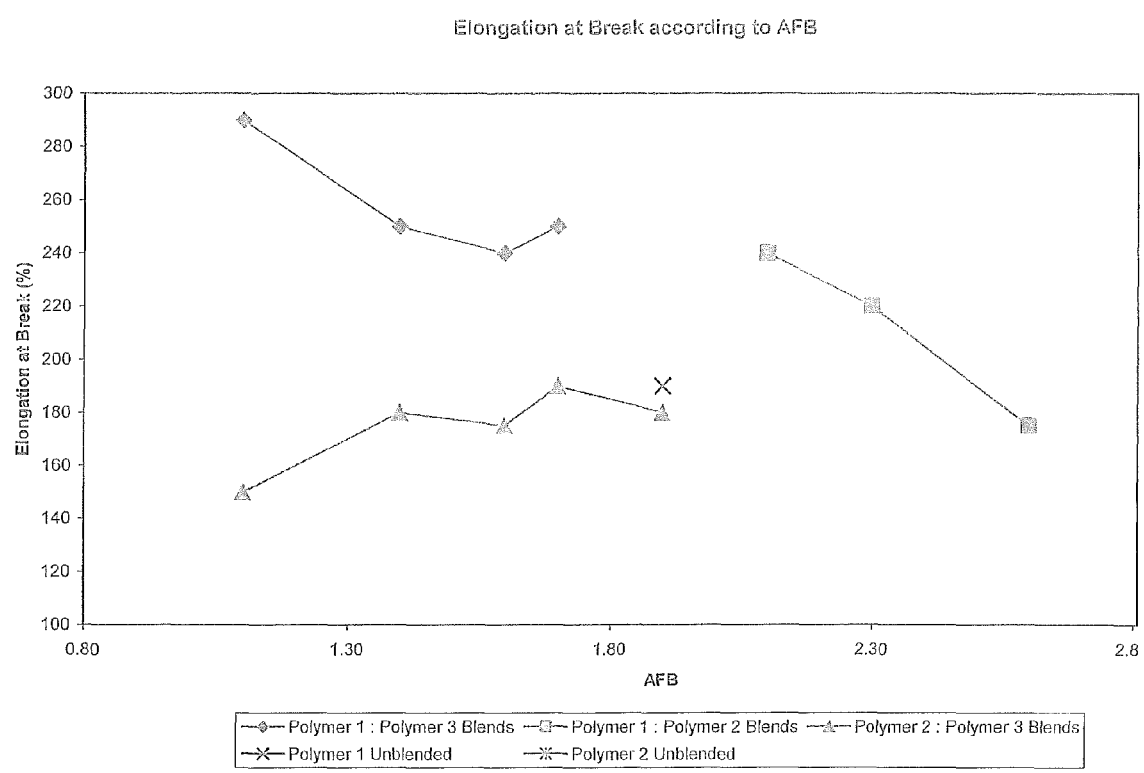
FIG. 5 is a graph of elongation to break results as a function of AFB of polymer resin blends according to the invention compared to conventional unblended results of the same polymers.

Certain surprising results are noticed from the above table and more easily depicted in FIGS. 3-5: first, compression set appears to depend only on AFB. Regardless of whether a blend was made from difunctional+trifunctional polymers or monofunctional+trifunctional polymers; the resulting compression set depended only on the average functionality. Secondly, from the tensile data (FIG. 4) it is apparent that there is an optimum functionality range for tensile strength, between about 2.1 and 2.5. Compositions in this AFB range have the best balance of overall properties for gasketing applications (tensile strength, elongation, compression set, Tg).

What is claimed is:

1. A composition comprising:
 a) a resin blend comprising:
  i) at least one polyacrylate-containing polymer component comprising at least three functional (meth)acrylate groups, said polymer component having a polydispersity of about 1.01 to about 2.50;
  ii) at least one reactive mono- or di-methacrylate-functionalized polymer component having a polydispersity of about 1.01 to about 2.50; and
 b) optionally at least one co-reactive component;
wherein the average functionality of the resin blend is about 1.8 to about 4.0,
and wherein the polymers of said resin blend have an average molecular weight of greater than about 5,000 g/mol.

2. The composition of claim 1, wherein the co-reactive component is present and comprises a mono- or multi-functional (meth)acrylate.

3. The composition of claim 1, wherein said resin blend has an average molecular weight of about 10,000-100,000 g/mol.

4. The composition of claim 1, wherein said resin blend includes a polymer backbone comprising a homopolymer or copolymer of one or more monomers selected from the group consisting of ethyl acrylate, methoxyethyl acrylate, n-butyl acrylate and combinations thereof.

5. The composition of claim 1, wherein said polymer resin includes one or more units selected from the group consisting of styrene, acrylonitrile, methacrylonitrile, acrylamide, substituted acrylamides and combinations thereof.

6. The composition of claim 1, further comprising a curing component.

7. The composition of claim 1, wherein the curing component is a photoinitiator.

8. The composition of claim 1, wherein the resin blend is present in amounts of about 30% to about 90% by weight of the total composition.

9. The composition of claim 1, wherein the mono- or multi-functional (meth)acrylate component is present in amounts up to about 50% by weight.

10. The composition of claim 1, wherein the mono- or multi-functional (meth)acrylate component comprises at least one alkyl(meth)acrylate monomer selected from the group consisting of $C_1$-$C_{28}$ alkyl(meth)acrylates.

11. The composition of claim 1, wherein the polymers of said resin blend are each products of controlled radical polymerization.

12. The composition of claim 1, further including reactive diluents, non-reactive diluents, fillers, plasticizers, stabilizers, antioxidants, curing agents, cross-linking agents, catalysts, pigments, elastomers, and combinations thereof.

13. The composition of claim 1, wherein the mono- or multi-functional (meth)acrylate component is a member selected from the group consisting of isobornyl(meth)acrylate; hydroxyethyl(meth)acrylate (HEMA); hydroxypropyl (meth)acrylate (HPMA); ethylene glycol diacrylate; ethylene glycol dimethacrylate; 1,6-hexanediol diacrylate; 1,6-hexanediol dimethacrylate; 1,4-butanediol diacrylate; pentaerythritol triacrylate; pentaerythritol tetraacrylate; dipentaerythritol pentaacrylate, methoxy-1,6-hexanediolpentaerythritol triacrylate; trimethylolpropane triacrylate; tetraethylene glycol diacrylate; polymethacrylate urethanes; epoxy acrylates; polyester acrylate monomers and oligomers; trimethylolpropane propoxylate triacrylate; poly-n-butyleneoxide glycol diacrylates; bisphenol A alkylene oxide adduct diacrylates; and mixtures thereof.

14. The composition of claim 7, wherein said photoinitiator is a member selected from the group consisting of: diphenylphosphinyl(2,4,6-trimethylphenyl)methanone (TPO); benzophenone; substituted benzophenones; acetophenone; substituted acetophenones; benzoin; benzoin alkyl esters; xanthone; substituted xanthones; diethoxy-acetophenone; benzoin methyl ether; benzoin ethyl ether; benzoin isopropyl ether; diethoxyxanthone; chloro-thio-xanthone; N-methyl diethanol-amine-benzophenone; 2-hydroxy-2-methyl-1-phenyl-propan-1-one; 2-benzyl-2-(dimethylamino)-1-[4-(4-morpholinyl)phenyl]-1-butanone; and mixtures thereof.

15. The composition of claim 7, wherein the photoinitiator is a member selected from the group consisting of camphoroquinone peroxyester initiators; 9-fluorene carboxylic acid peroxyesters; and mixtures thereof.

16. A resin blend composition comprising the reaction product of:
 i) at least one polyacrylate-containing polymer component comprising at least three functional (meth)acrylate groups, said polymer component having a polydispersity of about 1.01 to about 2.05;
 ii) at least one reactive mono- or di-methacrylate-functionalized polymer component having a polydispersity of about 1.01 to about 2.50; and
 iii) optionally at least one co-reactive component;
wherein the average functionality of the resin blend is about 1.8 to about 4.0;
wherein the polymers of said resin blend have an average molecular weight of greater than about 5,000 g/mol; and
wherein the composition has one or more or the following properties:
 (a) a compression set of less than about 35% after 70 hours of exposure at a temperature of about 70° C.;
 (b) an elongation at break (%) of about 150 to about 300 at about room temperature; and
 (c) a tensile strength (Mpa) of about 3 to about 8.

17. A process for applying a seal to an article comprising the steps of
 a) forming a composition comprising:
  i) at least one polyacrylate-containing polymer component comprising at least three functional (meth)acrylate groups, said polymer component having a polydispersity of about 1.01 to about 2.50;
  ii) at least one reactive mono- or di-methacrylate-functionalized polymer component having a polydispersity of about 1.01 to about 2.50; and
 b) optionally at least one co-reactive component;
 wherein the average functionality of the resin blend is about 1.8 to about 4.0,
and wherein the polymers of said resin blend have an average molecular weight of greater than about 5,000 g/mol;
 c) depositing said mixture on said article in the shape and thickness desired to form an uncured seal; and
 d) curing said uncured seal with a cure system appropriate to and for a time sufficient to form a cured seal.

18. A process for applying a seal to an article comprising the steps of a) forming a composition comprising a resin blend comprising:
   i) at least one polyacrylate-containing polymer component comprising at least three functional (meth)acrylate groups, said polymer component having a polydispersity of about 1.01 to about 2.50;
   ii) at least one reactive mono- or di-methacrylate-functionalized polymer component having a polydispersity of about 1.01 to about 2.50; and
b) optionally at least one co-reactive component;
wherein the average functionality of the resin blend is about 1.8 to about 4.0,
wherein the polymers of said resin blend have an average molecular weight of greater than about 5,000 g/mol;
c) depositing said composition on said article in the shape and thickness desired to form an uncured seal; and
d) joining said uncured seal to another article and curing said uncured seal with a curing system appropriate to and for a sufficient time to form a seal.

19. A process for applying a seal to an article comprising the steps of:
a) forming a composition including a resin blend comprising:
   i) at least one polyacrylate-containing polymer component including at least three functional (meth)acrylate groups, said polymer component having a polydispersity of about 1.01 to about 2.50;
   ii) at least one reactive mono- or di-methacrylate-functionalized polymer component having a polydispersity of about 1.01 to about 2.50; and
   iii) optionally at least one co-reactive component;
wherein the average functionality of the resin blend is about 1.8 to about 4.0,
wherein the polymers of said resin blend have an average molecular weight of greater than about 5,000 g/mol;
b) depositing said composition on said article in the shape and thickness desired to form an uncured seal;
c) curing said composition on said article; and
d) placing a second article in abutting relationship with said cured composition to form a seal between said article and said second article.

20. A method of preparing a multi-functionalized resin blend comprising:
a) providing a monomer composition in a solvent;
b) combining the monomer composition with a composition comprising;
   i) at least one multi-functional initiator having at least three of more functionalities;
   ii) at least one mono- or di-functional initiator; and
   iii) generally, an organometallic compound or a hydride of Group IV-VIII transition metals;

c) reacting the resulting reaction mixture at a sufficient time and temperature to form one or more multi-functional polymers, each of said polymers having a polydispersity of about 1.01 to about 2.50; and either
d) i) endcapping at least of portion of said polymers of said blend with reactive groups to form a blend having an average functionality of about 1.8 to about 4.0; and the polymers of said blend having an average molecular weight of from about 10,000 to about 100,000 g/mol; or
d) ii) providing a second monomer composition;
e) forming a second reaction mixture by combining the second monomer composition with a composition comprising;
   i) at least one mono- or di-functional initiator; and
   ii) an organometallic compound or a hydride of Group IV-VIII transition metals;
f) reacting the resulting mixture of step e) for a sufficient time and temperature to form a functional polymer having a mono- or di-functionality, said polymer having a polydispersity of about 1.01 to about 2.50;
g) forming a blend of the results of the reactions of steps c) and f); and
h) endcapping at least of portion of said polymers of said blend with reactive groups to form a blend having an average functionality of about 1.8 to about 4.0; and the polymers of said blend having an average molecular weight of from about 10,000 to about 100,000 g/mol; or
d) iii) endcapping at least of portion of said multi-functional polymer with reactive groups to achieve an average functionality of about 1.8 to about 4.0,
e) i) providing a second monomer composition in a solvent for said monomer;
f) i) forming a second reaction mixture by combining the second monomer composition with a composition comprising;
   1) at least one mono- or di-functional initiator; and
   2) an organometallic compound or a hydride of Group IV-VIII transition metals;
g) i) reacting the resulting mixture of step f) i) for a sufficient time and temperature to form a functional polymer having mono- or di-functionality, said polymer having a polydispersity of about 1.01 to about 2.50;
h) i) endcapping at least of portion of said mono- or di-functional polymer with reactive groups to achieve an average functionality of about 1.8 to about 4.0
i) forming a blend of the results of the reactions of steps d) and h) i); wherein said blend has an average functionality of about 1.8 to about 4.0; and the polymers of said blend having an average molecular weight of from about 10,000 to about 100,000 g/mol.

* * * * *